United States Patent
Frank et al.

(10) Patent No.: US 10,474,629 B2
(45) Date of Patent: Nov. 12, 2019

(54) FILE SYSTEMS WITH GLOBAL AND LOCAL NAMING

(71) Applicant: Elastifile Ltd., Herzliya (IL)

(72) Inventors: Shahar Frank, Ramat Hasharon (IL); Amos Ben-Ari, Yokneam Hamoshava (IL)

(73) Assignee: Elastifile Ltd., Herzliya (IL)

( * ) Notice: Subject to any disclaimer, the term of this patent is extended or adjusted under 35 U.S.C. 154(b) by 258 days.

(21) Appl. No.: 15/278,040

(22) Filed: Sep. 28, 2016

(65) Prior Publication Data
US 2018/0089186 A1  Mar. 29, 2018

(51) Int. Cl.
| G06F 7/00 | (2006.01) |
|---|---|
| G06F 16/11 | (2019.01) |
| G06F 11/14 | (2006.01) |
| G06F 16/188 | (2019.01) |

(52) U.S. Cl.
CPC .......... G06F 16/11 (2019.01); G06F 11/1451 (2013.01); G06F 16/188 (2019.01); G06F 2201/805 (2013.01); G06F 2201/815 (2013.01)

(58) Field of Classification Search
CPC ......... G06F 2201/815; G06F 2201/805; G06F 17/3007; G06F 17/30233; G06F 11/1451
USPC .......................................... 707/785, 655, 802
See application file for complete search history.

(56) References Cited

U.S. PATENT DOCUMENTS

| 7,606,868 | B1 * | 10/2009 | Le | G06F 17/30067 707/999.01 |
|---|---|---|---|---|
| 7,653,699 | B1 * | 1/2010 | Colgrove | G06F 17/30067 709/213 |
| 7,716,319 | B2 * | 5/2010 | Kataoka | H04L 29/12254 707/999.003 |
| 7,877,357 | B1 * | 1/2011 | Wu | G06F 11/1458 707/639 |
| 7,885,930 | B2 * | 2/2011 | Anzai | G06F 17/30197 707/639 |
| 9,424,058 | B1 * | 8/2016 | Wasson | G06F 9/455 |
| 9,507,799 | B1 * | 11/2016 | Goodson | G06F 17/30203 |
| 2007/0100980 | A1 * | 5/2007 | Kataoka | H04L 29/12254 709/223 |
| 2007/0239655 | A1 * | 10/2007 | Agetsuma | G06F 3/061 |
| 2007/0239720 | A1 * | 10/2007 | Kumar | G06F 17/30067 |
| 2007/0266027 | A1 * | 11/2007 | Gattegno | G06F 3/0605 |
| 2008/0195827 | A1 * | 8/2008 | Saika | G06F 11/1458 711/162 |
| 2010/0082675 | A1 * | 4/2010 | Shitomi | G06F 17/302 707/782 |
| 2012/0226662 | A1 * | 9/2012 | Swengler | G06F 17/30126 707/634 |
| 2012/0331021 | A1 * | 12/2012 | Lord | G06F 17/3015 707/826 |
| 2014/0149475 | A1 * | 5/2014 | Darcy | G06F 17/30194 707/827 |
| 2015/0066857 | A1 * | 3/2015 | Dayal | G06F 17/30088 707/639 |
| 2016/0004442 | A1 * | 1/2016 | Bailey | G06F 3/0604 711/112 |

\* cited by examiner

FOREIGN PATENT DOCUMENTS

EP  2535832 A1 * 12/2012  ......... G06F 9/45533

Primary Examiner — Mohammed R Uddin
(74) Attorney, Agent, or Firm — Honigman LLP

(57) ABSTRACT

A method for data storage includes specifying a plurality of File Systems (FSs) for use by multiple clients, including assigning to the FSs both respective global identifiers and respective client-specific names. The plurality of FSs is managed using the global identifiers, and files are stored for the clients in the FSs using the client-specific names.

18 Claims, 2 Drawing Sheets

FILE SYSTEMS WITH GLOBAL AND LOCAL NAMING

FIELD OF THE INVENTION

The present invention relates generally to data storage, and particularly to methods and systems for file-system management.

BACKGROUND OF THE INVENTION

Machine virtualization is commonly used in various computing environments, such as in data centers and cloud computing. A typical virtualized computing system comprises multiple compute nodes that are interconnected by a high-speed network. The compute nodes run Virtual Machines (VMs) that consume physical resources such as Central Processing Unit (CPU), memory, persistent storage and networking resources. Some computing systems use distributed File Systems (FSs) for persistent storage of files. Examples of distributed FSs include Google File System (GFS), Hadoop distributed file system (HDFS), Ceph, General Parallel File System (GPFS) and Lustre.

SUMMARY OF THE INVENTION

An embodiment of the present invention that is described herein provides a method for data storage. The method includes specifying a plurality of File Systems (FSs) for use by multiple clients, including assigning to the FSs both respective global identifiers and respective client-specific names. The plurality of FSs is managed using the global identifiers, and files are stored for the clients in the FSs using the client-specific names.

In some embodiments, the global identifiers are unique across the plurality of FSs, and the client-specific names are unique only within a subset of the FSs accessible to a given client. In an embodiment, assigning the client-specific names includes assigning a same client-specific name to at least two of the FSs in the plurality. In a disclosed embodiment, specifying the FSs includes specifying for each FS a single client that is permitted to access that FS. In another embodiment, specifying the FSs includes specifying for each FS a single set of cooperating clients that are permitted to access that FS.

In some embodiments, specifying and managing the FSs includes, upon creating a new clone of an existing client having an existing FS, creating for the new clone a new FS having a new global identifier but having the same client-specific name as the existing FS. In an example embodiment, specifying and managing the FSs includes continually maintaining for the existing client a shadow disk (VDISK) corresponding to one or more of the FSs used by the existing client, and creating the new FS includes reassigning storage resources, which were assigned to the shadow VDISK, to the new FS. In an embodiment, continually maintaining the shadow VDISK includes continually allocating to the shadow VDISK storage resources that match respective storage resources of the actual VDISK. In an embodiment, one or more of the FSs are backed-up by performing block-level backup of the shadow VDISK.

There is additionally provided, in accordance with an embodiment of the present invention, a data storage apparatus including an interface and one or more processors. The interface is configured for communicating with one or more compute nodes that run multiple clients. The one or more processors are configured to specify a plurality of File Systems (FSs) for use by the multiple clients, including assigning to the FSs both respective global identifiers and respective client-specific names, to manage the plurality of FSs using the global identifiers, and to store files for the clients in the FSs using the client-specific names.

There is also provided, in accordance with an embodiment of the present invention, a computer software product, the product including a tangible non-transitory computer-readable medium in which program instructions are stored, which instructions, when read by one or more processors, cause the processors to specify a plurality of File Systems (FSs) for use by multiple clients, including assigning to the FSs both respective global identifiers and respective client-specific names, to manage the plurality of FSs using the global identifiers, and to store files for the clients in the FSs using the client-specific names.

The present invention will be more fully understood from the following detailed description of the embodiments thereof, taken together with the drawings in which:

DETAILED DESCRIPTION OF EMBODIMENTS

Overview

Figure 1:
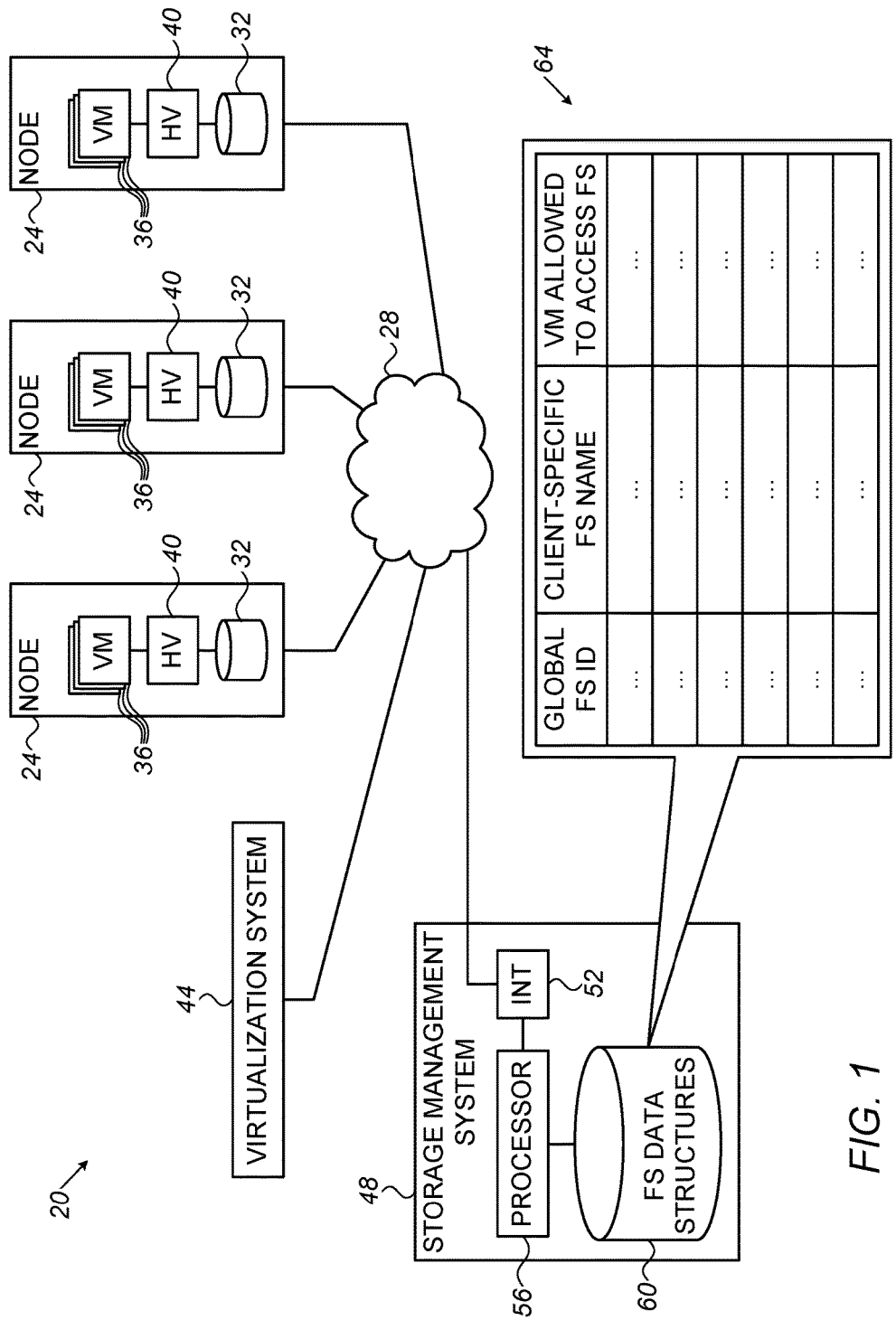
FIG. 1 is a block diagram that schematically illustrates a virtualized computing system, in accordance with an embodiment of the present invention.

Embodiments of the present invention that are described herein provide improved methods and systems for managing File Systems (FSs) for use by various types of clients, such as Virtual Machines (VMs) in virtualized computing systems. The embodiments described herein refer mainly to VMs, for the sake of clarity, but the disclosed techniques are not limited to VMs and can be used with any other suitable type of physical or virtual clients, such as physical machines, processes or containers.

In some embodiments, a storage management system operates in conjunction with a virtualization system (e.g., VMWare). The virtualization system creates and maintains a plurality of VMs, and the storage management system specifies and maintains network-based FSs for use by the VMs.

In the disclosed embodiments, the storage management system assigns one or more FSs to each VM. A given VM may be assigned any desired number of FSs. A given FS is typically accessible, however, only to a single VM, or in some cases to a single group of cooperating VMs.

In some embodiments, each FS is identified by two separate identifiers (IDs)—a global FS ID, and a client-specific FS name. The global FS IDs are unique across the entire system. The client-specific FS names, on the other hand, are unique only within the subset of FSs assigned to a given VM. The global FS IDs are used for identifying the FSs in the storage management system. The VMs are typically unaware of the global FS IDs of the FSs, and identify the FSs only by their client-specific FS names.

To maintain the FS configuration described above, the storage management system typically holds a list that specifies, for each FS, (i) the global FS ID, (ii) the client-specific FS name, and (iii) the identity of the VM that is assigned that FS and permitted to access the FS.

The dual naming scheme described herein has several important advantages:
- Simple and efficient cloning of clients, especially VMs and Containers.
- Improved management of namespaces that leads to better security and protection, and enables better support for self-service and multi-tenancy.
- Solution for the "namespace pollution" issue, i.e., each client having visibility to an exceedingly large number of FS objects.

Example methods that clone VMs using the global FS IDs and client-specific FS names are described herein.

Typically, a new VM cloned from a source VM is assigned a set of FSs, which have the same client-specific FS names as the corresponding FSs of the source VM, but new and globally-unique global FS IDs.

The virtualization system is typically unaware of the FS and its structure, and regards the entire body of data stored for a given VM as a block-based virtual disk (VDISK). In some embodiments, the storage management system uses built-in VDISK cloning mechanisms of the virtualization system to expedite the FS cloning process described above. In such embodiments, the virtualization system creates and maintains a "shadow VDISK" corresponding to one or more of the FSs used by a VM. During routine operation of the VM, the allocated size of the shadow VDISK is continually adjusted to match the corresponding FS size, even though no data is actually written to the shadow VDISK. When the VM is cloned, resources (e.g., storage space) allocated to the shadow VDISK can be assigned to the new VM, thereby shortening the overall cloning time.

Additional techniques that use the shadow VDISK mechanism, e.g., for backing-up FSs using built-in block-level VDISK backup mechanisms of the virtualization system, are also described.

System Description

FIG. 1 is a block diagram that schematically illustrates a virtualized computing system 20, in accordance with an embodiment of the present invention. System 20 may comprise, for example, a data center, a cloud computing system or a computing system that performs any other suitable function.

System 20 comprises multiple compute nodes 24 that communicate with one another over a computer communication network 28. Compute nodes 24 are referred to herein as nodes, for brevity, and may comprise, for example, servers, workstations or any other suitable type of compute node. Nodes 24 may communicate over network 28 in accordance with any suitable network communication protocol, such as Ethernet or Infiniband. System 20 may comprise any suitable number of compute nodes of any type. Nodes 24 may be collocated or located in multiple geographical locations. The collection of nodes 24 is also sometimes referred to as a cluster.

Nodes 24 run multiple Virtual Machines (VMs) 36, which in turn run client applications. A given node 24 may run any suitable number of VMs. In the present example, each node 24 runs a hypervisor (HV) 40. The hypervisor functions as a virtualization layer that allocates physical resources such as CPU, memory, storage and networking to VMs 36.

In the present example, each node comprises a CPU (not shown), volatile memory (not shown), one or more persistent storage devices 32, and a Network Interface Controller (NIC—not shown), which can be allocated by hypervisor 40 to VMs 36. Persistent storage devices 32 may comprise, for example, one or more Solid State Drives (SSDs) or Hard Disk Drives (HDDs).

Generally, not every node necessarily comprises all types of physical resources. Moreover, a given VM may utilize physical resources that do not necessarily reside locally on the node on which the VM runs. Further alternatively, some physical resources may not be associated with any particular node 24 but with the system as a whole. For example, one or more of storage devices 32 may be separate from nodes 24, e.g., connected to network 28 individually or via some storage controller.

System 20 further comprises a virtualization system 44 that manages the various VMs 36 running on nodes 24. Typical tasks performed by virtualization system 44 comprise creating new VMs, cloning VMs, and migrating VMs from one node 24 to another, for example. Virtualization system 44 may comprise a suitable commercial product such as VMWare®, or any other suitable system. Virtualization system 44 typically runs on a certain processor (e.g., a standalone processor or a processor of one of nodes 24) that is connected to network 28 by a suitable network interface.

In some embodiments, system 20 comprises a storage management system 48. System 48 manages data storage in persistent storage devices 32. Typically, system 48 uses the various storage devices 32 of the various nodes (and/or storage devices 32 that do not belong to the nodes) as a system-wide pool of persistent, non-volatile storage. Towards VMs 36, storage system 48 maintains multiple File Systems (FSs) that are used by the VMs for storing files in this persistent storage. Example techniques for maintaining this plurality of FSs are described in detail below.

In the present example, storage management system 48 comprises a network interface 52 for communicating over network 28 with nodes 24 and virtualization system 44, a processor 56 that is configured to carry out the methods described herein, and a memory 60 that holds one or more FS data structures. In the embodiment of FIG. 1, memory 60 holds a FS list 64 that lists the various FSs that processor 56 manages for VMs 36. As will be elaborated below, list 64 specifies for each FS a global FS identifier (ID), a client-specific name and the identity of the VM that is permitted to access that FS.

The configurations of system 20 and its various components shown in FIG. 1, e.g., virtualization system and storage management system 48, are example configurations that are chosen purely for the sake of conceptual clarity. In alternative embodiments, any other suitable system and/or system component configuration can be used.

For example, the virtualization system and the storage management subsystem may both run on the same processor or within the same computing platform. As another example, as noted above the disclosed techniques can be used with various types of clients, not necessarily VMs. As such, in some embodiments the virtualization system is omitted.

The different elements of nodes 24, virtualization system 44 and storage management system 48 may be implemented using suitable hardware, using software, or using a combination of hardware and software elements. In some embodiments, processor 56 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

File System Management Using Global and Client-Specific Naming

The client applications running on VMs 36, as well as the guest operating systems of the VMs, store data in files. For this purpose, processor 56 of storage management system 48 creates and assigns one or more File Systems (FSs) to each VM 36. Generally speaking, a given FS provides the VM with suitable protocols and data structures for storing files on storage devices 32.

Processor 56 maintains a plurality of FSs that are listed on list 64. A given VM may be assigned one or more FSs. A given FS, on the other hand, is typically accessible only to a single VM. In some alternative embodiments, though, a given FS is accessible to and used by a single group of cooperating VMs.

In the embodiments described herein, each FS is identified by two separate identifiers (IDs)—a global FS ID, and a client-specific FS name (sometimes referred to as a "global ID" and "client-specific name" for brevity). Each of these identifiers may comprise a numerical value, an alphanumeric string or any other suitable type of identifier. The global ID is referred to as an "ID" and the client-specific name is referred to as a "name" purely for the sake of clarity.

The two types of identifiers have different characteristics and play different roles. The global IDs are unique across the entire plurality of FSs on list 64, and thus across system 20. In other words, no two FSs in system 20 have the same global ID.

The client-specific FS names are unique only within the subset of FSs assigned to a given VM. Thus, a given VM cannot be assigned two FSs having the same client-specific name. On the other hand, it is quite possible that list 64 comprise multiple FSs having the same client-specific name, assigned to different VMs.

The global IDs are used for identifying the FSs in storage management system 48. The VMs are typically unaware of the global IDs of the FSs, and identify the FSs only by their client-specific names. A given VM is typically only aware of (and permitted to access) the FSs assigned thereto, and unaware of (and not allowed to access) FSs assigned to other VMs. These permissions are configured by processor 56.

Virtualization system 44 is typically unaware of any of the identifiers, and is generally not exposed to the FS structure at all. From the perspective of the virtualization system, the data stored by the VMs is represented by virtual disks (VDISKs), or not at all.

FS list 64, which is created and maintained by processor 56, specifies the configuration explained above. As can be seen in FIG. 1, list 64 specifies for each FS (i) the global FS ID, (ii) the client-specific name, and (iii) the identity of the VM that is assigned that FS and permitted to access it. In alternative embodiments, processor 56 may use any other suitable data structure or structures that specify the associations between VMs and FSs, the global IDs and the client-specific names.

The use of global and client-specific naming means that the storage management system and the VMs have different views of the storage system structure, and also that different VMs have different views of the storage system structure. Consider, for example, two different VMs that query processor 56 for the list of available FS. In response, each of the two VMs will receive from processor 56 a list of the client-specific names of the FSs assigned to that VMs. In some cases (e.g., when one VM is a clone of the other) the lists of client-specific names will be the same, but in fact belong to different FSs having different global IDs and possibly different content.

VM Cloning Using Global and Client-Specific Naming

The dual naming scheme described above lends itself to simple and efficient cloning of VMs. The term "cloning" means creation of an identical copy of an existing VM, including both machine configuration, operating system, applications and data content. After cloning, the original VM and the cloned copy will typically operate separately and would no longer remain identical. Cloning is useful, for example, for creating new VMs of a certain type from a predefined "template VM." In the description that follows, the original VM, from which the clone is created, is also referred to as a source VM. The newly-created VM is referred to as "new VM" or "cloned VM."

Figure 2:
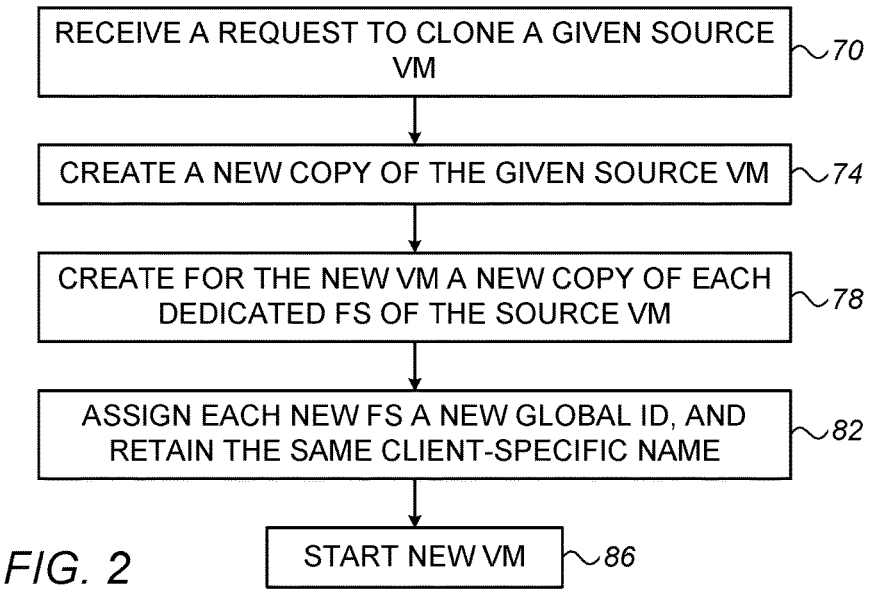
FIG. 2 is a flow chart that schematically illustrates a method for cloning a Virtual Machine (VM), in accordance with an embodiment of the present invention.

FIG. 2 is a flow chart that schematically illustrates a method for cloning a VM, in accordance with an embodiment of the present invention. The method begins with virtualization system 44 receiving a request (e.g., from an administrator) to clone a given source VM 36, at a cloning request step 70. In response, the virtualization system creates a new VM, at a VM creation step 74.

As part of the new VM creation process, the virtualization system typically specifies for the new VM an address (e.g., IP address or MAC address) with which the new VM is to communicate for obtaining network-based FS services. This address is associated with storage management system 48. Among other initialization tasks, the new VM starts communicating with the specified address.

Processor 56 of storage management system 48 is able to detect that a new VM was created, e.g., by detecting a request from a previously-unknown address (e.g., the MAC or IP address of the new VM). Moreover, processor 56 is able to detect that this VM is a clone, and identify the identity of the source VM from which the new VM was cloned.

Upon detecting the appearance of a new VM, processor 56 creates a new set of (one or more) FSs for the new VM, at a FS creation step 78. The new set of FSs comprises a new copy of each FS used by the source VM. The newly-created set of FSs typically has the same structure, size and data content as the set of FSs of the source VM. The new copies may be created, for example, using a conventional copy operation, as a snapshot, or any other suitable cloning method.

At a naming step 82, processor 56 assigns a global ID and a client-specific name to each of the newly-created FSs of the new VM. Specifically, each newly-created FS of the new VM is assigned a new (globally unique) global ID, and assigned the same client-specific name as that of the corresponding FS (of the source VM). In other words, after cloning, the source VM and the cloned VM have two separate sets of FSs, having the same client-specific names but globally unique global IDs.

Virtualization system 44 starts the new VM, at a starting step 86. From this point, the new VM operates separately from the source VM. As such, the structure and content of the new VM's FSs will typically diverge from those of the source VM.

VM Cloning Using Shadow Vdisk

As explained above, the process of cloning a VM involves cloning the set of FSs to be used by the new VM, including FS structure (e.g., volumes, directories and files, relevant data structures and metadata), and data content (e.g., actual files and their data content). In many practical cases, the set of FSs to be cloned may be large and complex. Moreover, since most virtualization systems (such as VMWare's vSphere) are unaware of file system storage, the embedded cloning process does not handle the case of file system cloning at all.

In some embodiments, system 20 improves the existing VM cloning process and supports the creation of the new FSs by specifying, in advance, an artificial "shadow VDISK" for one or more of the file systems used by VM 36. This mechanism forces virtualization system 44 (which is only aware of VDISKs and is unaware of any FS structure) to process the cloning of those shadow disks, and such cloning can be the trigger of a file server side FS cloning. Triggering can be in response to identifying the copy operations on the shadow disk (which are implemented as a file or set of files within the file system), and/or can use the special cloning verbs that some systems provide (such as the VMWare VAAI with its block level XCOPY and NAS-level clone semantics). The actual copy can be done by a simple copy, a snapshot-based mechanism, or any other suitable copy mechanism.

Figure 3:
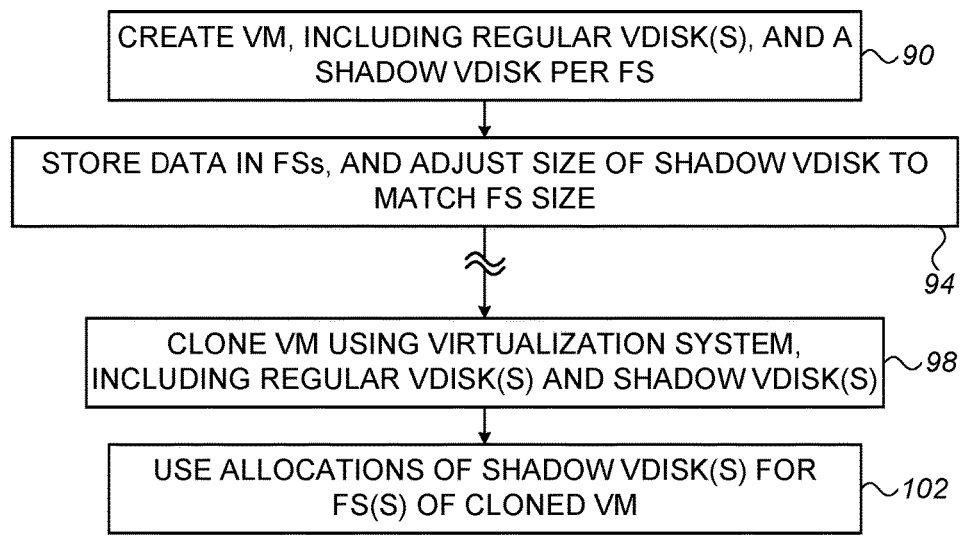
FIG. 3 is a flow chart that schematically illustrates a method for efficient cloning of a VM using a shadow virtual disk, in accordance with an embodiment of the present invention.

FIG. 3 is a flow chart that schematically illustrates a method for efficient cloning of a VM using a shadow VDISK, in accordance with an embodiment of the present invention. The method begins with virtualization system 44 creating a VM, at a creation step 90. This VM is referred to as a source VM, even though at this stage there is typically no indication that this VM is going to be cloned in the future.

As part of the VM creation process, the virtualization system may define for the VM one or more VDISKs. These VDISKs are to be used for storing any suitable data for the VM, e.g., the VM's guest operating system, applications and application data.

In addition, virtualization system 44 creates a respective "shadow VDISK" for one or more of the file systems attached to this VM. In some embodiments, a shadow VDISK corresponds only to FSs that are dedicated to that VM (e.g., VM private FSs), not to FSs that are shared with other VMs. Unlike the regular VDISKs, the shadow VDISK is not used for storing data. The role of the shadow VDISK is to force the virtualization system to process the FS, required as part of the process of creating a new VM that will be cloned from the source VM being created at step 90.

During the routine operation of the source VM, at an operation step 94, the VM stores data in its FSs. In parallel, the storage management system adjusts the size of the shadow VDISK to match the size of the corresponding file system. As a result, the virtualization system cloning process is aligned with the actual process required for the cloning of the FSs of the VM during the clone. For example, if the FS to be cloned is 1 TB in size, the shadow disk will also be approximately 1 TB in size, such that the virtualization system expects its cloning process to take considerable time. Without such alignment, the virtualization system may give-up and abort the cloning as it takes too long.

Note that the shadow disk does not contain data, and the VM does not write to it. Nevertheless, the size of the shadow VDISK is adjusted to match the size of the corresponding file system. It is typically sufficient that the size of the shadow VDISK is maintained at approximately the same size of the file system, i.e., an exact match is not mandatory.

At a later point in time, the virtualization system receives a request to create a new VM that clones the source VM, and begins the cloning process, at a cloning step 98. As part of the cloning operation, the virtualization system clones both the regular VDISK(s) and the shadow VDISK(s) of the VM.

Since the shadow VDISK was continually maintained at approximately the same size as the corresponding FS, the necessary resource allocations (e.g., storage space) are already in-place. Thus, at a reallocation step 102, these resources are allocated for use by the new FSs of the new VM. This reallocation process is relatively short, and therefore this technique shortens the overall cloning time.

In an alternative embodiment, the virtualization system does not adjust the size of the shadow VDISK along the lifetime of the VM, e.g., maintains the shadow VDISK with a size of zero. In such a case, the shadow VDISK is used only as a trigger for the actual cloning, but as the cloning process itself can be very fast (e.g., if a snapshot mechanism is used), there is no need to align the expected cloning latency (time).

In some embodiments, the "shadow VDISK" technique can be used for other purposes. For example, storage management system 48 may use the shadow VDISK for backing-up FS. Typically, the virtualization system has built-in mechanisms for backing-up VDISKs. These mechanisms are typically at block-level and not file-level. By creating and maintaining shadow VDISKs, storage management system 48 may use these existing block-level backup mechanisms of the virtualization system to back-up file-level FSs.

Although the embodiments described herein mainly address managing FSs for use by VMs in virtualized environments, the methods and systems described herein can also be used in other applications, such as for managing FSs for other types of clients, as explained above.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for data storage, comprising:

specifying a plurality of File Systems (FSs) for use by multiple clients, including assigning to the FSs both respective global identifiers and respective client-specific names, such that at least one of the client-specific names is assigned by a plurality of different clients of the multiple clients to a plurality of different respective FSs;

maintaining, by a storage management system, a list specifying for each FS, a global ID, a corresponding client permitted to access the FS and a corresponding client-specific FS name;

receiving, by the storage management system, client accesses to the FSs for storing files, in which the file systems are identified by their client-specific names; and managing, by the storage management system, the plurality of FSs responsively to the received client accesses, using the global identifiers corresponding to the client-specific names in the received client accesses, while the clients are unaware of the global identifiers.

2. The method according to claim 1, wherein the global identifiers are unique across the plurality of FSs, and wherein the client-specific names are unique only within a subset of the FSs accessible to a given client.

3. The method according to claim 1, wherein specifying the FSs comprises specifying for each FS a single client that is permitted to access that FS.

4. The method according to claim 1, wherein specifying the FSs comprises specifying for each FS a single set of cooperating clients that are permitted to access that FS.

5. The method according to claim 1, wherein specifying and managing the FSs comprises, upon creating a new clone of an existing client having an existing FS, creating for the new clone a new FS having a new global identifier but having the same client-specific name as the existing FS.

6. The method according to claim 5, wherein specifying and managing the FSs comprises continually maintaining for the existing client a shadow virtual disk (VDISK) corresponding to one or more of the FSs used by the existing client, and wherein creating the new FS comprises reassigning storage resources, which were assigned to the shadow VDISK, to the new FS.

7. The method according to claim 6, wherein continually maintaining the shadow VDISK comprises continually allocating to the shadow VDISK storage resources that match respective storage resources of the existing FS.

8. The method according to claim 6, and comprising backing-up one or more of the FSs by performing block-level backup of the shadow VDISK.

9. A data storage apparatus, comprising:
an interface for communicating with one or more compute nodes that run multiple clients; and
one or more processors, configured to specify a plurality of File Systems (FSs) for use by the multiple clients, including assigning to the FSs both respective global identifiers and respective client-specific names, to maintain a list specifying for each FS, a global ID, a corresponding client permitted to access the FS and a corresponding client-specific FS name, such that at least one of the client-specific names is assigned by a plurality of different clients of the multiple clients to a plurality of different respective FSs, to receive client accesses to the FSs for storing files, in which the file systems are identified by their client-specific names, and to manage the plurality of FSs responsively to the received client accesses, using the global identifiers corresponding to the client-specific names in the received client accesses, while the clients are unaware of the global identifiers.

10. The apparatus according to claim 9, wherein the global identifiers are unique across the plurality of FSs, and wherein the client-specific names are unique only within a subset of the FSs accessible to a given client.

11. The apparatus according to claim 9, wherein the one or more processors are configured to specify for each FS a single client that is permitted to access that FS.

12. The apparatus according to claim 9, wherein the one or more processors are configured to specify for each FS a single set of cooperating clients that are permitted to access that FS.

13. The apparatus according to claim 9, wherein, upon creating a new clone of an existing client having an existing FS, the one or more processors are configured to create for the new clone a new FS having a new global identifier but having the same client-specific name as the existing FS.

14. The apparatus according to claim 13, wherein the one or more processors are configured to continually maintain for the existing client a shadow virtual disk (VDISK) corresponding to one or more of the FSs used by the existing client, and to create the new FS by reassigning storage resources, which were assigned to the shadow VDISK, to the new FS.

15. The apparatus according to claim 14, wherein the one or more processors are configured to continually allocate to the shadow VDISK storage resources that match respective storage resources of the existing FS.

16. The apparatus according to claim 14, wherein the one or more processors are configured to back-up one or more of the FSs by performing block-level backup of the shadow VDISK.

17. A computer software product, the product comprising a tangible non-transitory computer-readable medium in which program instructions are stored, which instructions, when read by one or more processors, cause the processors to specify a plurality of File Systems (FSs) for use by multiple clients, including assigning to the FSs both respective global identifiers and respective client-specific names, such that at least one of the client-specific names is assigned by a plurality of different clients of the multiple clients to a plurality of different respective FSs, to maintain a list specifying for each FS, a global ID, a corresponding client permitted to access the FS and a corresponding client-specific FS name, to receive client accesses to the FSs for storing files, in which the file systems are identified by their client-specific names, and to manage the plurality of FSs responsively to the received client accesses, using the global identifiers corresponding to the client-specific names in the received client accesses, while the clients are unaware of the global identifiers.

18. The product according to claim 17, wherein the global identifiers are unique across the plurality of FSs, and wherein the client-specific names are unique only within a subset of the FSs accessible to a given client.

* * * * *